United States Patent
Ban et al.

(10) Patent No.: US 11,387,526 B2
(45) Date of Patent: Jul. 12, 2022

(54) ULTRASONIC WELDING SYSTEM OF RECHARGEABLE BATTERY AND MANUFACTURING METHOD OF RECHARGEABLE BATTERY USING THE SAME

(71) Applicants: HYUNDAI MOTOR COMPANY, Seoul (KR); KIA MOTORS CORPORATION, Seoul (KR)

(72) Inventors: Jinho Ban, Suwon-si (KR); Se Hyun Kim, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 185 days.

(21) Appl. No.: 16/829,622

(22) Filed: Mar. 25, 2020

(65) Prior Publication Data
US 2021/0098766 A1 Apr. 1, 2021

(30) Foreign Application Priority Data
Sep. 30, 2019 (KR) .................. 10-2019-0120375

(51) Int. Cl.
| H01M 4/02 | (2006.01) |
| H01M 50/54 | (2021.01) |
| B23K 20/10 | (2006.01) |
| B23K 26/21 | (2014.01) |
| H01M 50/502 | (2021.01) |

(52) U.S. Cl.
CPC ............ *H01M 50/54* (2021.01); *B23K 20/10* (2013.01); *B23K 26/21* (2015.10); *H01M 50/502* (2021.01); *H01M 2220/20* (2013.01)

(58) Field of Classification Search
CPC ...................................... H01M 4/02
See application file for complete search history.

(56) References Cited

U.S. PATENT DOCUMENTS

| 2013/0011717 A1* | 1/2013 | Yotsumoto ............ B23K 20/10 429/153 |
| 2018/0040918 A1* | 2/2018 | Guen .................. H01M 50/581 |
| 2018/0358608 A1* | 12/2018 | Mino ................ H01M 10/0431 |

* cited by examiner

*Primary Examiner* — Jacob B Marks
(74) *Attorney, Agent, or Firm* — Lempia Summerfield Katz LLC

(57) ABSTRACT

An ultrasonic welding system for a rechargeable battery for mutually welding and bonding includes: a welding apparatus including an anvil and a horn to perform welding and bonding an electrode tab and an electrode lead extending from an electrode assembly of the rechargeable battery through ultrasonic welding by mutually pressing the electrode tab and the electrode lead supplied between the anvil and the horn; and a supply device moves in a vertical or horizontal direction and supplies the electrode lead between the anvil and the horn.

14 Claims, 9 Drawing Sheets

ULTRASONIC WELDING SYSTEM OF RECHARGEABLE BATTERY AND MANUFACTURING METHOD OF RECHARGEABLE BATTERY USING THE SAME

CROSS-REFERENCE TO RELATED APPLICATION

This application claims priority to and the benefit of Korean Patent Application No. 10-2019-0120375, filed on Sep. 30, 2019, the entire contents of which are incorporated herein by reference.

FIELD

The present disclosure relates to an ultrasonic welding system of a rechargeable battery, and a manufacturing method of a rechargeable battery using the same.

BACKGROUND

The statements in this section merely provide background information related to the present disclosure and may not constitute prior art.

A rechargeable battery capable of being charged and discharged is widely used as an energy source of wireless mobile devices.

Also, rechargeable batteries are attracting attention as a power source for electric vehicles (EV), hybrid electric vehicles (HEV), plug-in hybrid electric vehicles (Plug-In HEV), etc. that are presented as a solution to air pollution and the like of conventional gasoline vehicles and diesel vehicles using fossil fuels.

While small mobile devices use one or more battery cells per device, medium and large devices such as automobiles use a battery module in which a plurality of battery cells are electrically connected or a battery pack in which a plurality of battery modules are electrically connected due to the necessity of high power/capacity.

Since it is preferable for the medium and large battery module to be manufactured with as small a size and weight as possible, a prismatic battery and a pouch type battery, which may have a high integration degree and have a small weight with respect to capacity, are mainly used as a battery cell of a medium and large battery module.

Meanwhile, in order to use the battery module or the battery pack composed of a plurality of battery cells as a battery for the vehicle such as a hybrid electric vehicle, a plug-in hybrid electric vehicle, an electric vehicle, and the like, it is very important to configure the battery pack in which unit cells of various types are connected according to the required battery capacity.

That is, a structure having various types of electrical series/parallel connections in the same the battery module may have high competitiveness.

In this case, the electrical connection of the battery cells is possible by ultrasonically welding each stack and each lead terminal of the battery cells with an ultrasonic welding device.

The ultrasonic welding apparatus according to a conventional art is composed of a horn, an anvil disposed to face the horn, and an ultrasonic actuator for selectively applying a vibration to the horn according to a control signal of a computer.

According to the above configuration, in order to weld each lead terminal and each stack, the lead terminals and the stack are stacked to be disposed between the horn and the anvil and then the ultrasonic actuator is operated.

Accordingly, when the horn vibrates and presses the lead terminal and the stack, the lead terminal and the stack may be welded by frictional heat generated between the lead terminal and the stack.

However, we have discovered that the ultrasonic welding apparatus according to the conventional art has a problem that a portion where the stack is bent and in contact with the lead terminal is damaged and torn.

The above information disclosed in this Background section is only for enhancement of understanding of the background of the present disclosure and therefore it may contain information that does not form the prior art that is already known to a person of ordinary skill in the art.

SUMMARY

The present disclosure provides an ultrasonic welding system for a rechargeable battery and a manufacturing method of the rechargeable battery using the same that are capable of reducing or minimizing damage to the electrode tab by disposing and bonding an electrode lead on an electrode tab without directly applying ultrasonic waves to the electrode tab from the horn.

In exemplary forms of the present disclosure, an ultrasonic welding system for a rechargeable battery includes: a welding apparatus including an anvil and a horn and configured to perform welding and bonding an electrode tab and an electrode lead extending from an electrode assembly of the rechargeable battery through ultrasonic welding by mutually pressing the electrode tab and the electrode lead supplied between the anvil and the horn; and a supply device configured to be movable in a vertical or horizontal direction to supply the electrode lead between the anvil and the horn.

In one form, the electrode tab is mounted to the anvil and the anvil supports a lower portion of the electrode tab, and the horn is disposed to face an upper portion of the anvil and presses the electrode lead onto the electrode tab to perform the ultrasonic welding.

In another form, the anvil may have a lower welding surface in contact with an upper surface of the electrode tab. The lower welding surface of the anvil has a predetermined pattern.

In the anvil, a fixing member clamping and fixing the electrode lead supplied from the supply device to at the upper portion of the electrode tab may be mounted at one side corresponding to the lower welding surface.

The fixing member may have a supporting part formed at the position corresponding to a lower molding surface of the anvil, and a moving part configured to be driven in an up and down direction by operation of a cylinder on the supporting part. The moving part may fix the electrode lead on the supporting part.

The horn may have an upper welding surface made with a predetermined pattern.

The welding apparatus may further include: a pusher to fix the electrode tab upwardly and downwardly outside the lower welding surface of the anvil when the electrode tab is disposed at the lower welding surface of the anvil.

The supply device may include: a clamping part configured to slide and move along a guide rail formed in the anvil and horn side in a state of clamping the electrode lead; a vertical actuator installed at one side of a main bracket fitted on the guide rail and moving the clamping part mounted to the front end in the vertical direction; and a horizontal actuator installed at the other side of the main bracket and moving the main bracket along with the clamping part in the horizontal direction.

The clamping part may include a pair of finger members clamping the electrode lead while being reciprocated in near and far directions by the operation of the cylinder connected to the vertical actuator.

The vertical actuator may be connected to the clamping part in the state of being installed to the main bracket, and may slide and move the clamping part in the vertical direction by a cylinder operation.

The horizontal actuator may include a linear guide having one side front end fixed to the guide plate disposed closely to the guide rail and the other side front end connected to the main bracket and configured to move the main bracket along the guide rail along with the clamping part.

In some exemplary forms of the present disclosure, a manufacturing method for a rechargeable battery by using the ultrasonic welding system of the rechargeable battery above-described is disclosed. In one form, the manufacturing method includes: disposing, by the supply device, an electrode tab between the anvil and the horn; supplying, by the supply device, an electrode lead on the electrode tab; fixing the electrode lead through a fixing member disposed at one side of the anvil; and lowering the horn with respect to the anvil to perform ultrasonic welding.

Disposing the electrode tab may include: seating the electrode tab to be disposed at the lower welding surface of the anvil; and pressing lower and upper parts of the electrode tab outside the lower welding surface through a pusher to be fixed.

Supplying the electrode lead may include: supplying the electrode lead between a pair of finger members of a clamping part of the supply device; moving the electrode lead on the electrode tab through a horizontal actuator; and lowering the electrode lead through a vertical actuator to be in contact with the electrode tab.

The horizontal actuator may move the clamping part in a horizontal direction along a guide rail by operation of a linear guide.

The vertical actuator may move the clamping part in the vertical direction by operation of a cylinder.

Fixing the electrode lead may include lowering a moving part of the fixing member to fix the electrode lead.

Forming the ultrasonic welding may include: applying an ultrasonic wave to the electrode tab and the electrode lead disposed between the lower welding surface of the anvil and the upper welding surface of the horn by operation of an ultrasonic wave actuator for welding and bonding.

The manufacturing method may include: after fixing the electrode lead, combining an electrode assembly and a pouch exterior member in a state in which the parts of the electrode tab and the electrode lead are exposed to the outside of the pouch exterior member.

The ultrasonic welding system of the rechargeable battery and the manufacturing method of the rechargeable battery using the same according to an exemplary form of the present disclosure of the present disclosure do not directly apply the ultrasonic waves to the electrode tab from the horn by disposing and bonding the electrode lead on the electrode tab, thereby reducing damage to the electrode tab.

In addition, the ultrasonic welding system of the rechargeable battery and the manufacturing method of the rechargeable battery using the same of the present disclosure may prevent one side of the electrode tab from being torn during the welding by applying the pusher means, thereby there are effects of improving durability and improving welding strength.

Further, effects that can be obtained or expected from exemplary forms of the present disclosure are directly or suggestively described in the following detailed description. That is, various effects expected from exemplary forms of the present disclosure will be described in the following detailed description.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 5:
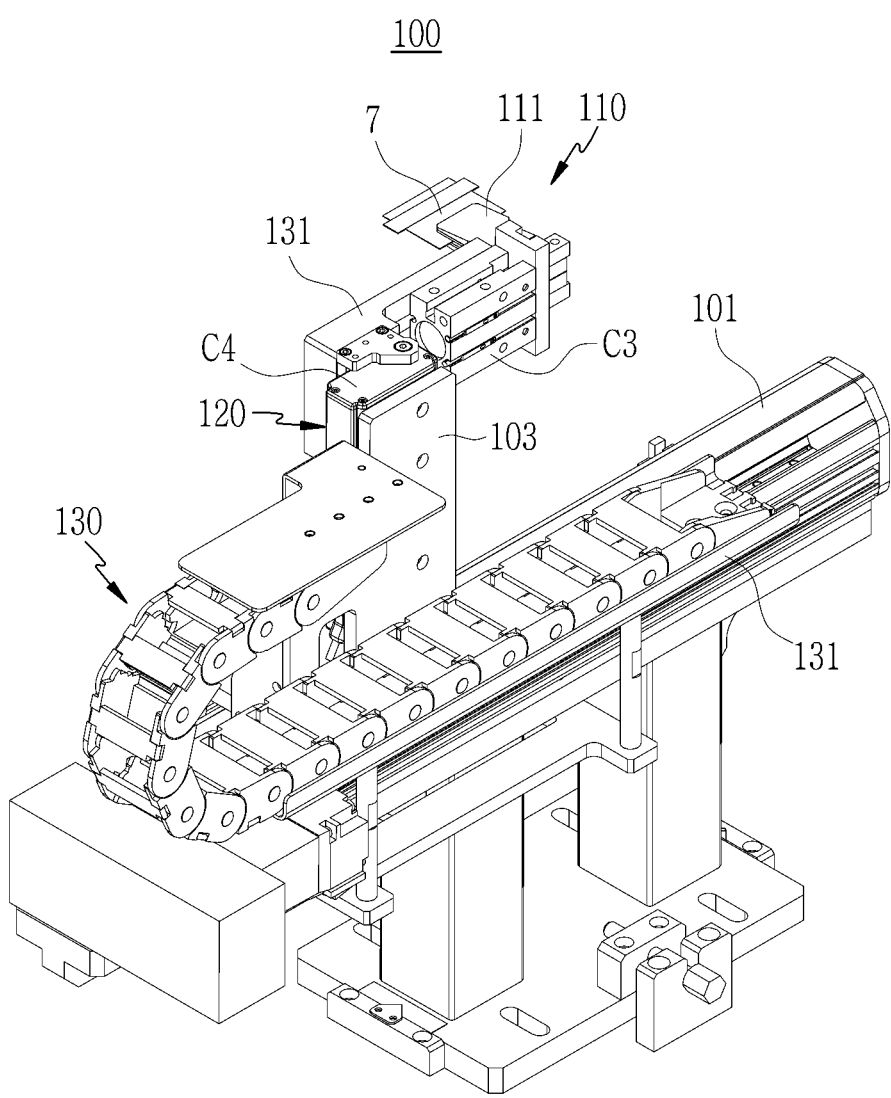

FIG. 5 is a schematic diagram of the other side of a supply device applied to an ultrasonic welding system of a rechargeable battery according to an exemplary form of the present disclosure; and FIG. 6 to FIG. 9 are process views sequentially showing a manufacturing method of a rechargeable battery using an ultrasonic welding system of a rechargeable battery according to an exemplary form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The present disclosure will be described more fully hereinafter with reference to the accompanying drawings, in which exemplary forms of the present disclosure are shown. As those skilled in the art would realize, the described forms may be modified in various different ways, all without departing from the spirit or scope of the present disclosure.

Parts not relevant to the description of exemplary forms of the present disclosure are omitted for describing the present disclosure clearly.

Figure 1:
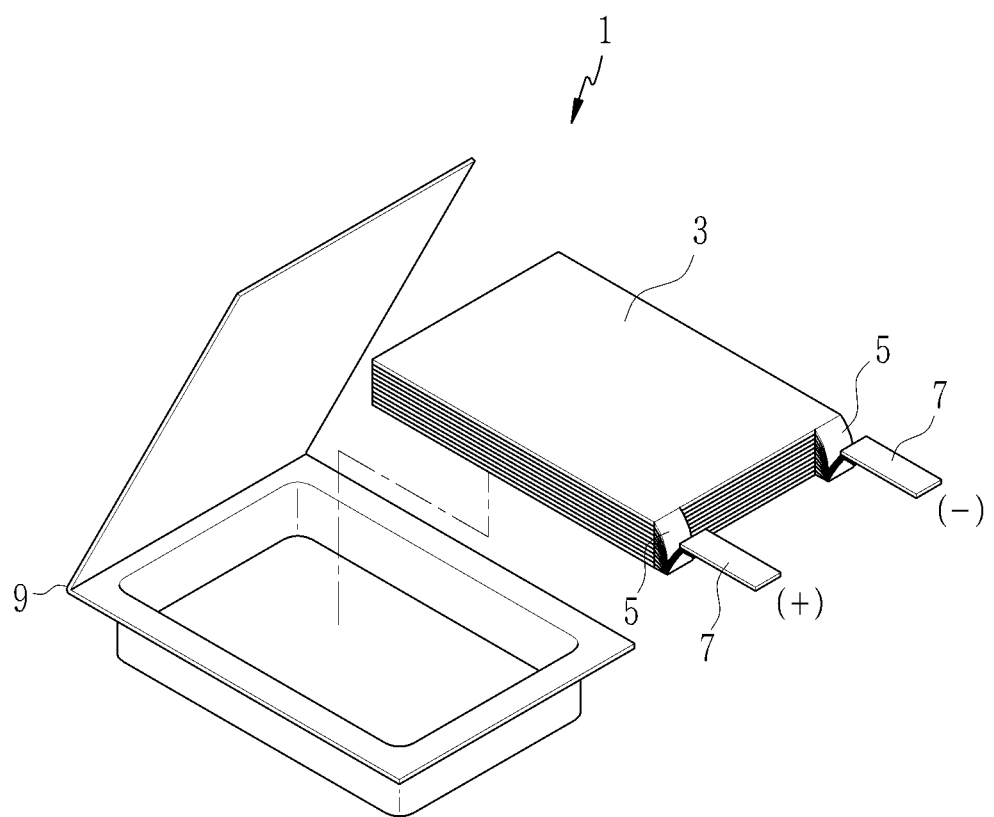
FIG. 1 is a schematic diagram of a rechargeable battery manufactured by using an ultrasonic welding system of a rechargeable battery according to an exemplary form of the present disclosure.

FIG. 1 is a schematic diagram of a rechargeable battery manufactured by using an ultrasonic welding system of a rechargeable battery according to an exemplary form of the present disclosure.

A rechargeable battery manufactured by using an ultrasonic welding system of a rechargeable battery according to an exemplary form of the present disclosure is described as a pouch type of rechargeable battery as an example.

Referring to FIG. 1, the pouch type of rechargeable battery 1 includes an electrode assembly 3, an electrode tab 5 of a plurality of sheets extending from the electrode assembly 3, an electrode lead 7 welded and bonded to the electrode tab 5, and a pouch exterior member 9 receiving the electrode assembly 3.

The electrode assembly 3 as a generation element in which a positive electrode and a negative electrode are sequentially stacked while disposing a separator therebetween may be formed of a structure of a stack type, a jelly roll type, or a stack/folding type.

The electrode tab 5 extends from each electrode plate of the electrode assembly 3, and the electrode lead 7 is electrically connected to the electrode tab 5 extending from each electrode plate of a plurality of sheets by welding, respectively.

In addition, the electrode tab 5 and the electrode lead 7 are electrically connected and are coupled in a form of being partially exposed to the outside of the pouch exterior member 9.

The pouch exterior member 9 is generally made of a soft exterior material such as an aluminum laminate sheet, and an internal space for accommodating the electrode assembly 3 is formed.

In addition, when the electrode tab 5 and the electrode lead 7 are welded, an ultrasonic welding technique having a good heat-affected zone (HAZ) and easy welding of a thin metal foil is mainly used.

The ultrasonic welding is a technique for generating an ultrasonic vibration of 10 kHz~75 kHz, and welding the metal through ultrasonic vibration friction heat between the metals.

That is, in the state that the electrode tab 5 and the electrode lead 7 are in contact with each other, if the ultrasonic wave vibration is applied by a welding apparatus 10 according to an exemplary form of the present disclosure, frictional heat is generated on a contacting surface between the electrode tab 5 and the electrode lead 7, and the electrode tab 5 and the electrode lead 7 are welded to each other by this frictional heat.

To this end, the ultrasonic welding system of the rechargeable battery according to one form of the present disclosure includes the welding apparatus 10 and a supply device 100.

Figure 2:
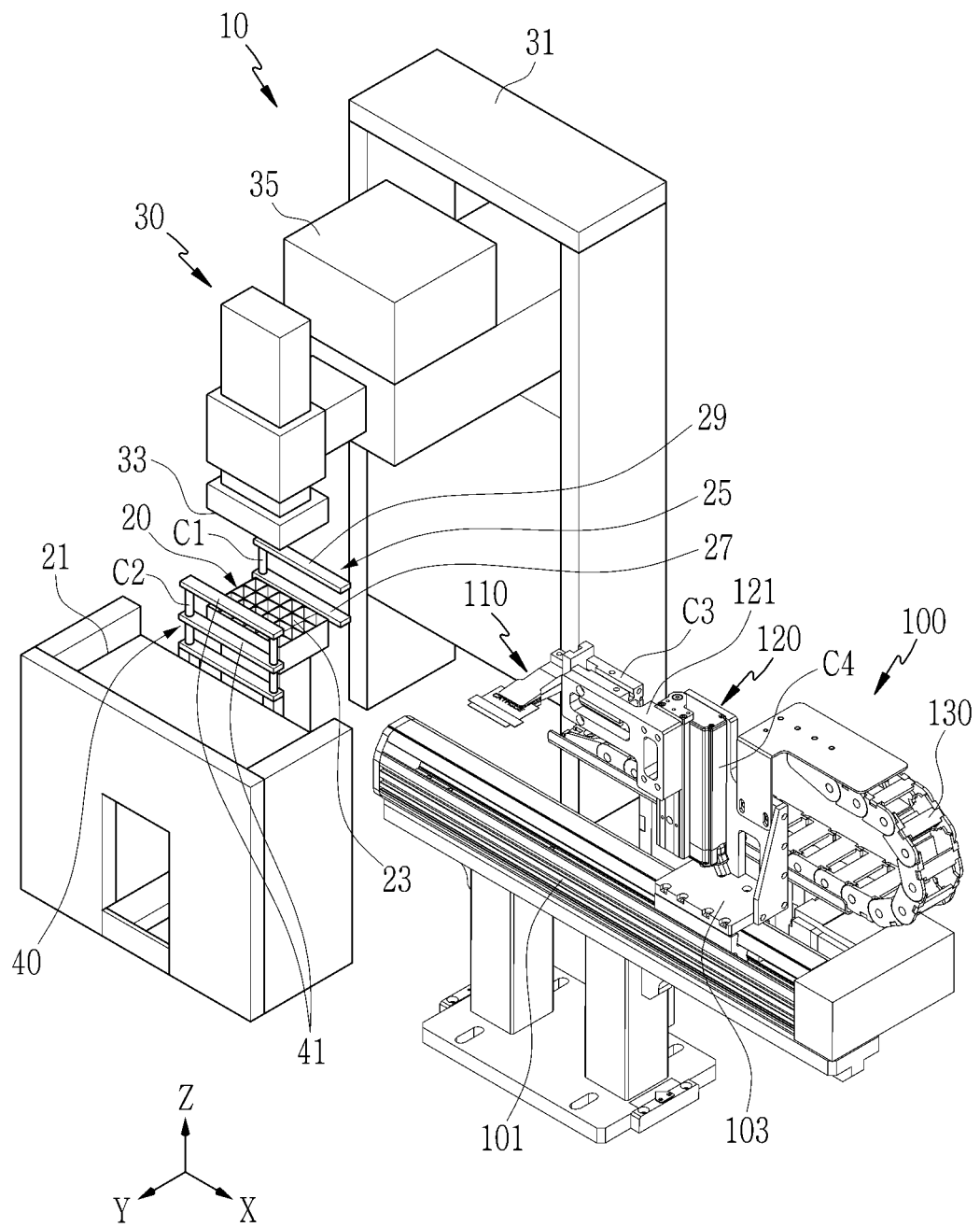
FIG. 2 is a schematic diagram of an ultrasonic welding system of a rechargeable battery according to an exemplary form of the present disclosure.
Figure 3:
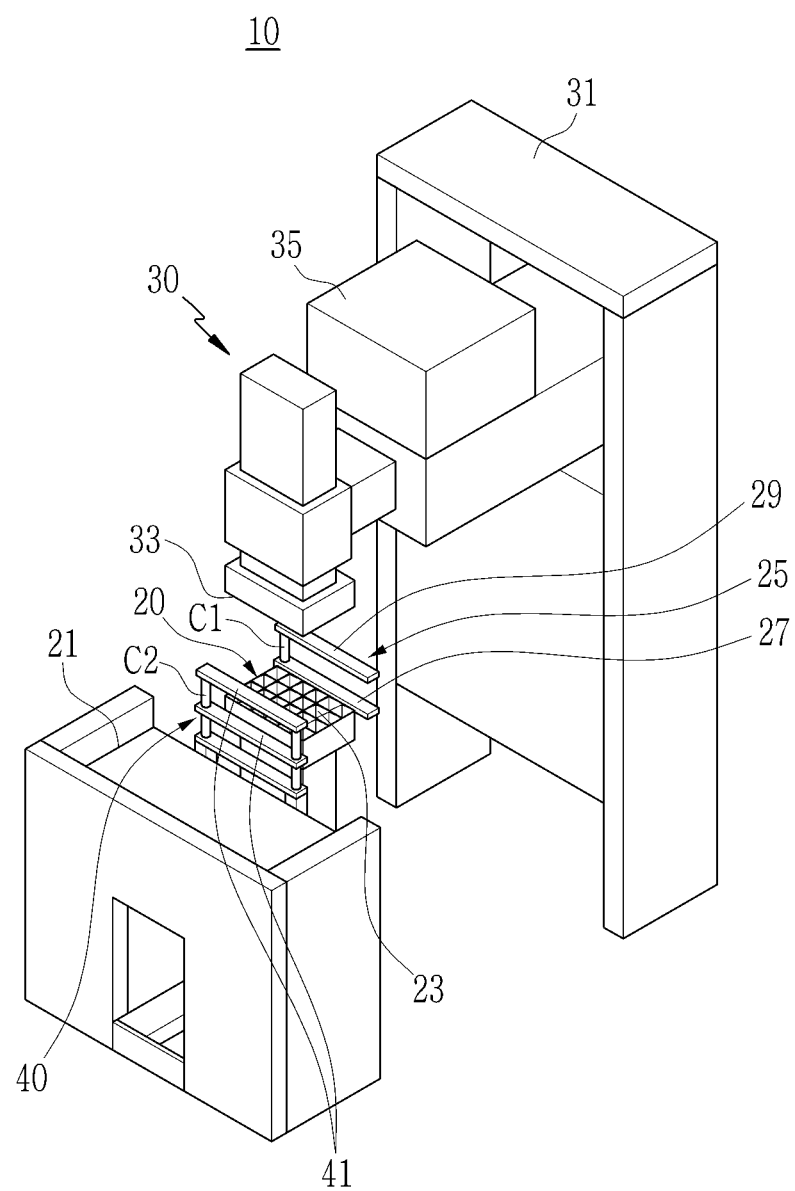
FIG. 3 is a schematic diagram of a welding apparatus applied to an ultrasonic welding system of a rechargeable battery according to an exemplary form of the present disclosure.

FIG. 2 is a schematic diagram of an ultrasonic welding system of a rechargeable battery according to an exemplary form of the present disclosure, and FIG. 3 is a schematic diagram of a welding apparatus applied to an ultrasonic welding system of a rechargeable battery according to one exemplary form of the present disclosure.

Prior to the description, in the vehicle industry, generally, a vehicle body length direction is referred to as a T direction, a vehicle width direction is referred to as an L direction, and a height direction of the vehicle body is referred to as an H direction.

However, in the exemplary forms of the present disclosure, an x-axis and a y-axis are set in a horizontal direction, and a z-axis is set in a vertical direction without setting the L, T, and H directions as the reference direction.

However, since the definition of the reference direction as described above is relative and may be varied depending on the reference position of the present apparatus 100 or the reference position of the assembly part and the like, the reference direction is not necessarily limited to the reference direction of the present exemplary form.

Referring to FIG. 2 and FIG. 3, the welding apparatus 10 includes an anvil 20, a horn 30, an ultrasonic wave actuator 35 connected to the horn 30, and a pusher means 40.

The anvil 20 supports the lower portion of the electrode tab 5 by mounting the electrode tab 5 extending from the electrode assembly 3.

In this case, the electrode assembly 3 is disposed on a mounting table 21 configured at one side of the anvil 20. The anvil 20 has a lower welding surface 23 formed in a predetermined pattern on the upper surface in contact with the electrode tab 5.

In this case, the lower welding surface 23 may have the predetermined pattern.

That is, the lower welding surface 23 may be formed of a surface protruded with the predetermined pattern to widen a friction area.

In addition, the anvil 20 is provided with a fixing member 25 for clamping the supplied electrode lead 7 to the upper portion of the electrode tab 5.

The fixing member 25 may be installed corresponding to the lower welding surface 23.

That is, the fixing member 25 has a support part 27 formed at a position corresponding to the lower molding surface of the anvil 20, and a moving part 29 driving in an up and down direction is formed at the upper part of the support part 27.

The fixing member 25 may fix the electrode lead 7 by interposing the electrode lead 7 between the support part 27 and the moving part 29 which is driven up and down by the operation of the cylinder C1.

The horn 30 is installed through a frame 31 corresponding to the upper portion of the anvil 20.

The horn 30 is formed to be movable in an up and down direction, and when the electrode tab 5 and the electrode lead 7 are supplied to each other and contact each other, the horn 30 serves to perform the ultrasonic welding while pressing the electrode lead 7 disposed on the upper portion to the electrode tab 5 side.

The horn 30 is connected to the ultrasonic wave actuator 35 and is configured to generate the ultrasonic wave through the ultrasonic wave actuator 35.

The horn 30 includes an upper welding surface 33 made with a predetermined pattern at the lower surface in contact with the electrode lead 7 like the anvil 20.

In this case, the upper welding surface 33 may also have the predetermined pattern.

That is, the upper welding surface 33 may be formed of a surface protruding in a predetermined pattern in order to widen the friction area with the electrode lead 7.

Also, the pusher means 40 is configured between the mounting table and the anvil 20, thereby serving to fix the electrode tab 5 extending from the electrode assembly 3 so as to not be torn by the friction and the like during the ultrasonic welding.

The pusher means 40 includes a pair of pusher ends 41 for driving in a direction away from or toward each other, and the pusher ends 41 are configured to be driven in an up and down direction by the cylinders C2 on both sides.

In the adjacent position of the welding apparatus 10 configured as mentioned above, the supply apparatus 100 which supplies the electrode lead 7 to the welding apparatus 10 is configured.

Figure 4:
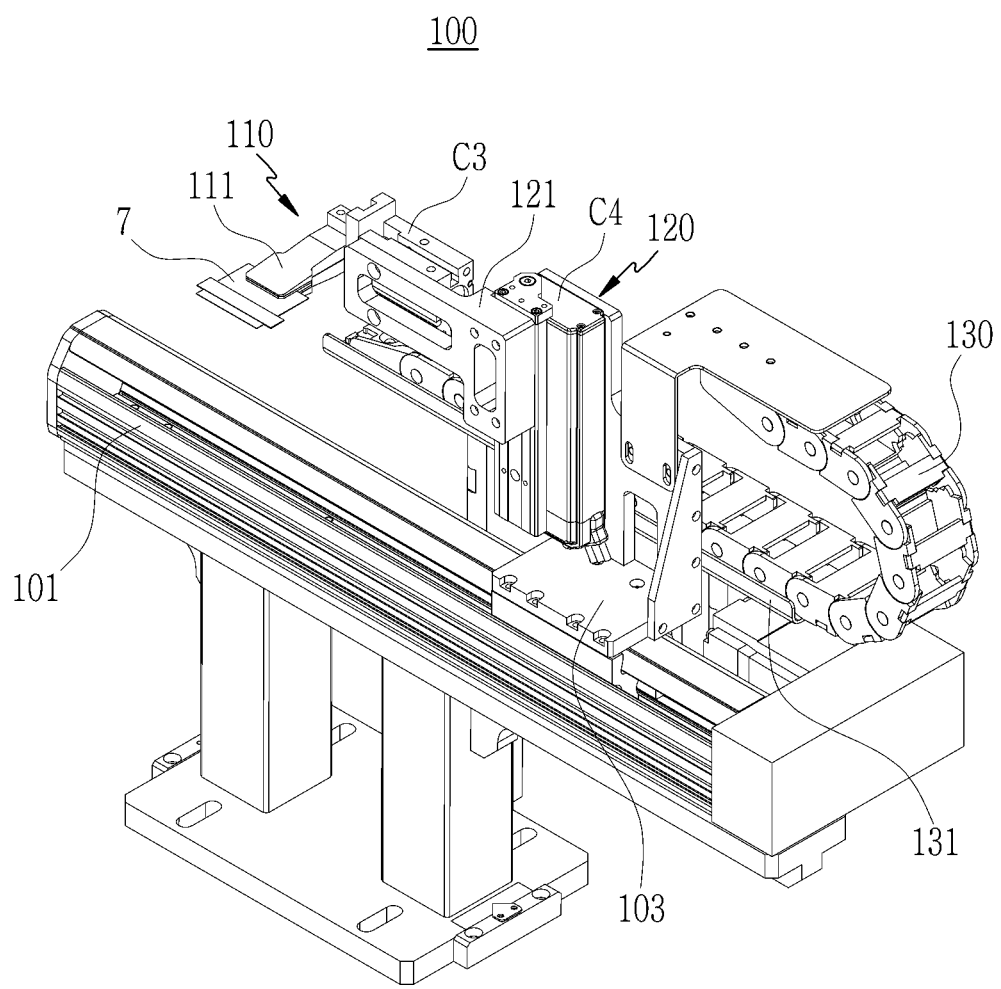
FIG. 4 is a schematic diagram of one side of a supply device applied to an ultrasonic welding system of a rechargeable battery according to an exemplary form of the present disclosure.

FIG. 4 is a schematic diagram of one side of a supply device applied to an ultrasonic welding system of a rechargeable battery according to an exemplary form of the present disclosure, and FIG. 5 is a schematic diagram of the other side of a supply device applied to an ultrasonic welding system of a rechargeable battery according to an exemplary form of the present disclosure.

Referring to FIG. 4 and FIG. 5, the supply device 100 includes a clamping part 110, a vertical actuator 120, and a horizontal actuator 130.

First, the supply device 100 is configured to move in the horizontal direction along a guide rail 101.

At this time, the guide rail 101 is disposed so that the front end is led to the side of the welding apparatus 10.

A main bracket 103 is fitted on the guide rail 101 so that the main bracket 103 may move and slide in the horizontal direction along the guide rail 101.

The clamping part 110 is configured at the front end of the main bracket 103, that is, the front end of the welding apparatus 10 side in the progressing direction.

The clamping part 110 clamps the electrode lead 7 and supplies the electrode lead 7 to the welding apparatus 10, and may be configured to clamp the electrode lead 7 while a pair of finger members 111 are reciprocated in the direction in which the pair of finger members 111 are close to or far from each other by the operation of the cylinder C3.

That is, the pair of finger members 111 are connected to the drive shaft of the cylinder and configured to clamp or unclamp the electrode lead 7.

In this case, the cylinder is mounted to the vertical actuator 120 installed in the main bracket 103 through a connection bracket 121.

In addition, the vertical actuator 120 is mounted on one side of the main bracket 103, and is configured to move the connection bracket 121 in the vertical direction together with the clamping part 110.

For example, the vertical actuator 120 may be an air cylinder.

Also, the horizontal actuator 130 is connected to the other side of the main bracket 103, and the horizontal actuator 130 is configured to move the main bracket 103 in the horizontal direction along the guide rail 101.

More specifically, the horizontal actuator 130 is fixed to the guide plate 131 of which the front end of one end is disposed adjacent to the guide rail 101 and the front end of the other end is connected to the main bracket 103.

For example, the horizontal actuator 130 may include a linear guide.

The above-described supply device 100 is formed of a structure in which the horizontal actuator 130 is mounted on the other side and the clamping part 110 is mounted to the vertical actuator 120 through the connection bracket 121 in the state in which the main bracket 103 is fitted on the guide rail 101 and the vertical actuator 120 is mounted to one side of the main bracket 103.

Next, a method of manufacturing the rechargeable battery by using the ultrasonic welding system of the rechargeable battery is described.

FIG. 6 to FIG. 9 are process views sequentially showing a manufacturing method of a rechargeable battery using an ultrasonic welding system of a rechargeable battery according to an exemplary form of the present disclosure.

Figure 6:
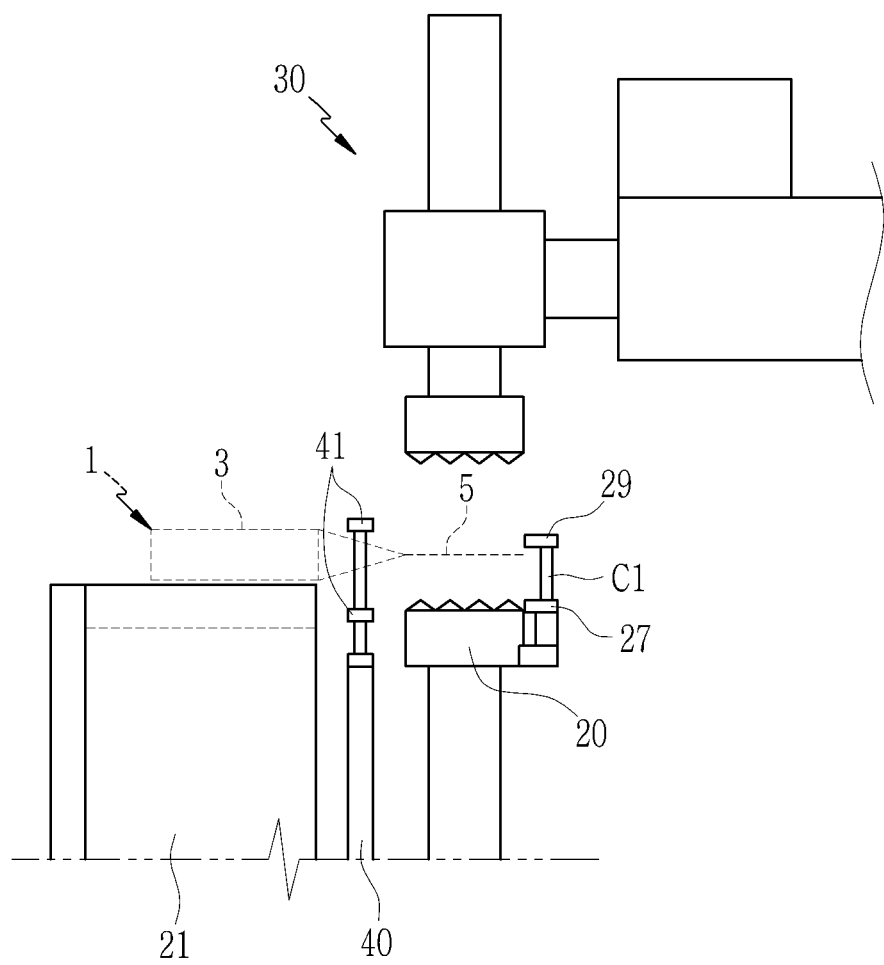

Referring to FIG. 6, the electrode tab 5 is normally disposed between the anvil 20 and the horn 30.

The electrode tab 5 is disposed on the lower welding surface 23 of the anvil 20 in the state in which the electrode assembly 3 is seated on the mounting table 21.

At this time, in order to prevent the electrode tab 5 from being torn during the ultrasonic welding, the electrode tab 5 is pressed upward and downward through the pusher means 40 at the position away from the lower welding surface 23 by a predetermined distance.

Figure 7:
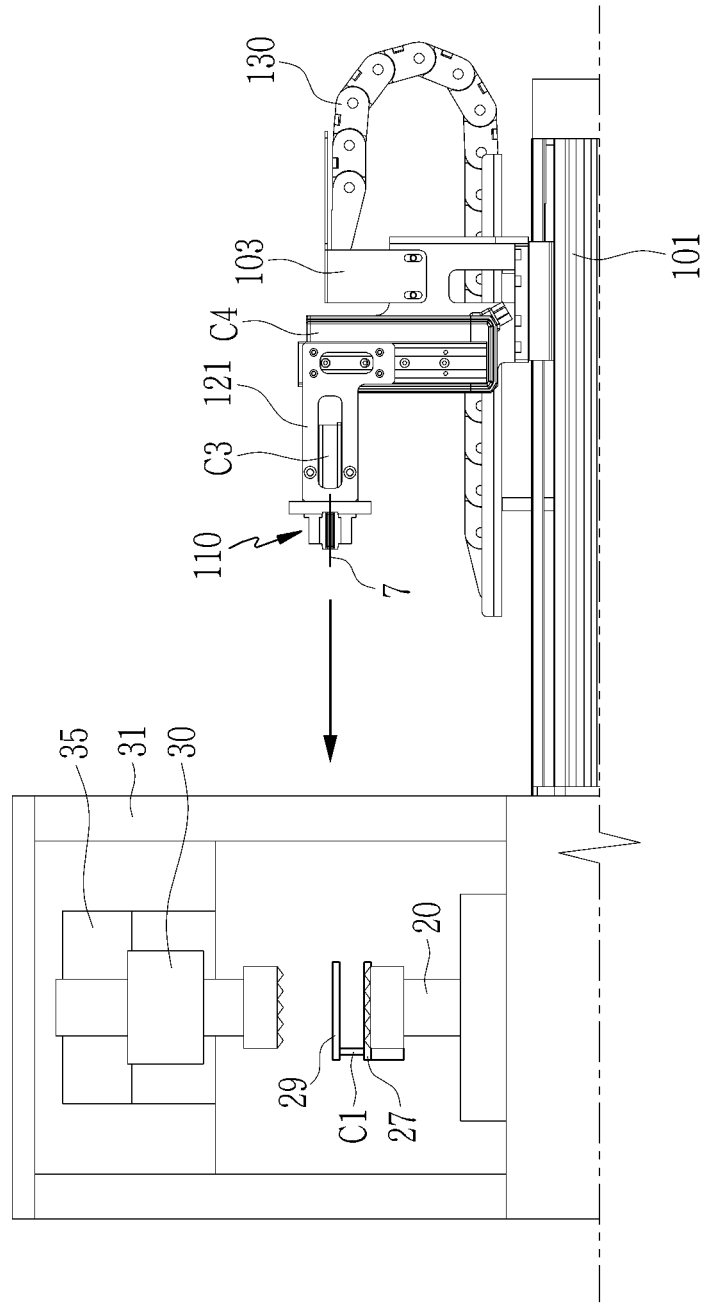

Referring to FIG. 7, to supply the electrode lead 7 on the electrode tab 5, first, the electrode lead 7 is suppled between the pair of finger members 111 of the clamping part 110.

The clamping part 110 clamping the electrode lead 7 moves on the electrode tab 5 through the horizontal actuator 130.

Subsequently, the clamping part 110 is lowered through the vertical actuator 120 to contact the electrode tab 5 and the electrode lead 7.

Figure 8:
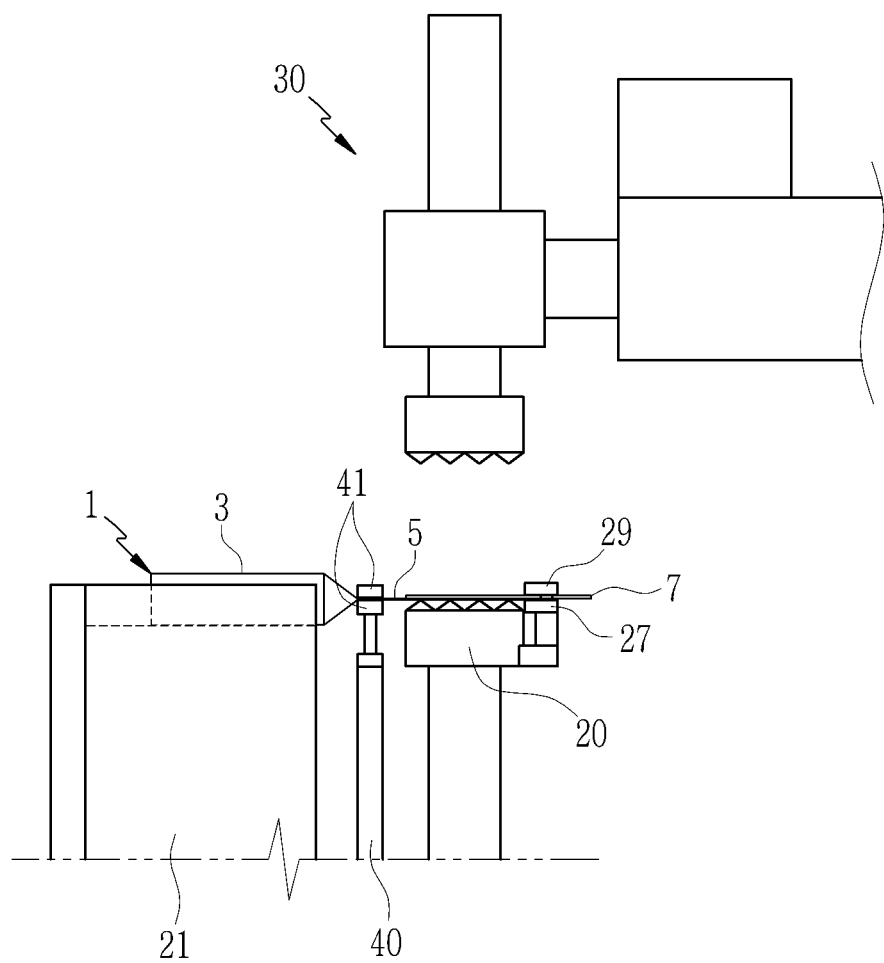

Referring to FIG. 8, the moving part 29 of the fixing member 25 disposed at one side of the anvil 20 is lowered to fix the electrode lead 7 so as to not be moved.

Figure 9:
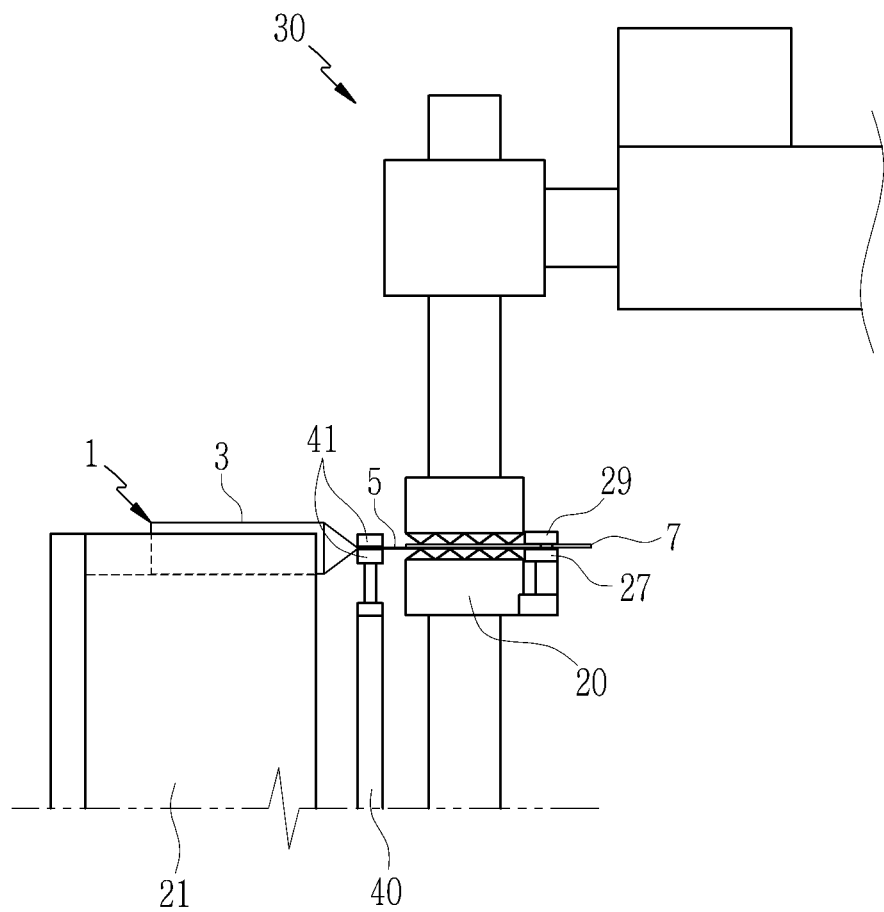

Referring to FIG. 9, the horn 30 is operated to be lowered and the ultrasonic wave is applied to the electrode tab 5 and the electrode lead 7 interposed between the lower welding surface 23 of the anvil 20 and the upper welding surface 33 of the horn 30 by the operation of the ultrasonic wave actuator 35 to be mutually welding-bonded.

Finally, the electrode assembly 3 and the pouch exterior member 9 are bonded, and in this case, they are mutually combined in the state in which the parts of the electrode tab 5 and the electrode lead 7 that are mutually welded to each other are mutually bonded to be exposed to the outside of the pouch exterior member 9.

Accordingly, as the ultrasonic welding system of the rechargeable battery and the manufacturing method of the rechargeable battery using the same according to the present disclosure disposes and combines the electrode lead 7 on the electrode tab 5, the damage of the electrode tab 5 may be reduced or minimized since the ultrasonic wave is not directly applied to the electrode tab 5 from the horn 30.

In additional, as the ultrasonic welding system of the rechargeable battery and the manufacturing method of the rechargeable battery using the same according to the present disclosure applies the pusher means 40, during the welding, one side of the electrode tab 5 may be prevented from being torn, thereby improving the durability and improving welding strength.

While this present disclosure has been described in connection with what is presently considered to be practical exemplary forms, it is to be understood that the present disclosure is not limited to the disclosed forms. On the contrary, it is intended to cover various modifications and equivalent arrangements included within the spirit and scope of the appended claims.

<Description of symbols>

1: rechargeable battery
3: electrode assembly
5: electrode tab
7: electrode lead
9: pouch exterior member
10: welding apparatus
20: anvil
21: mounting table
23: lower welding surface
25: fixing member
27: supporting part
29: moving part
30: horn
31: frame
33: upper welding surface
35: ultrasonic wave actuator
40: pusher means
41: pusher end <Description of symbols>

100: supply device
101: guide rail
103: main bracket
110: clamping part
111: finger member
120: vertical actuator
121: connection bracket
130: horizontal actuator
131: guide plate

What is claimed is:

1. An ultrasonic welding system for a rechargeable battery, the ultrasonic welding system comprising:
a welding apparatus including an anvil and a horn and configured to perform welding and bonding an electrode tab and an electrode lead extending from an electrode assembly of the rechargeable battery through ultrasonic welding by mutually pressing the electrode tab and the electrode lead supplied between the anvil and the horn; and
a supply device configured to be movable in a vertical or horizontal direction and supply the electrode lead between the anvil and the horn,
wherein:
the electrode tab is mounted to the anvil and the anvil is configured to support a lower portion of the electrode tab, and
the horn disposed to face an upper portion of the anvil and configured to press the electrode lead onto the electrode tab to perform the ultrasonic welding,
wherein:
the anvil has a lower welding surface configured to contact with an upper surface of the electrode tab, and
the lower welding surface of the anvil has a predetermined pattern,
wherein in the anvil,
a fixing member is mounted at one side corresponding to the lower welding surface and configured to clamp and fix the electrode lead to the upper portion of the electrode tab, and
wherein:
the fixing member has a supporting part formed at a position corresponding to a lower molding surface of the anvil, and a moving part configured to be driven in an up and down direction by an operation of a cylinder on the supporting part, and
the moving part is configured to fix the electrode lead on the supporting part.

2. The ultrasonic welding system of claim 1, wherein the horn has an upper welding surface made with a predetermined pattern.

3. The ultrasonic welding system of claim 1, wherein the welding apparatus further includes: a pusher configured to fix the electrode tab upwardly and downwardly outside a lower welding surface of the anvil when the electrode tab is disposed at the lower welding surface of the anvil.

4. An ultrasonic welding system for a rechargeable battery, the ultrasonic welding system comprising:
a welding apparatus including an anvil and a horn and configured to perform welding and bonding an electrode tab and an electrode lead extending from an electrode assembly of the rechargeable battery through ultrasonic welding by mutually pressing the electrode tab and the electrode lead supplied between the anvil and the horn; and
a supply device configured to be movable in a vertical or horizontal direction and supply the electrode lead between the anvil and the horn,
wherein the supply device includes:
a clamping part configured to slide and move along a guide rail formed in the anvil and horn side in a state of clamping the electrode lead;
a vertical actuator installed at a first side of a main bracket fitted on the guide rail and moving the clamping part mounted to a front end in the vertical direction; and
a horizontal actuator installed at a second side of the main bracket and moving the main bracket along with the clamping part in the horizontal direction.

5. The ultrasonic welding system of claim 4, wherein the clamping part includes a pair of finger members clamping the electrode lead while being reciprocated in near and far directions by a cylinder connected to the vertical actuator.

6. The ultrasonic welding system of claim 4, wherein the vertical actuator is connected to the clamping part in the state of being installed to the main bracket, and slides and moves the clamping part in the vertical direction by a cylinder operation.

7. The ultrasonic welding system of claim 4, wherein the horizontal actuator includes a linear guide having a first side front end fixed to a guide plate disposed closely to the guide rail and a second side front end connected to the main bracket and configured to move the main bracket along the guide rail along with the clamping part.

8. A manufacturing method for a rechargeable battery using an ultrasonic welding system, where the ultrasonic welding system includes a welding apparatus including an anvil and a horn, and a supply device, the manufacturing method comprising:
disposing, by the supply device, an electrode tab between the anvil and the horn;
supplying, by the supply device, an electrode lead on the electrode tab;
fixing the electrode lead through a fixing member disposed at one side of the anvil; and
lowering the horn with respect to the anvil to perform ultrasonic welding,
wherein supplying the electrode lead includes:
supplying the electrode lead between a pair of finger members of a clamping part of the supply device;
moving the electrode lead on the electrode tab through a horizontal actuator; and
lowering the electrode lead through a vertical actuator to be in contact with the electrode tab.

9. The manufacturing method of claim 8, wherein disposing the electrode tab includes:
seating the electrode tab to be disposed at a lower welding surface of the anvil; and
pressing, by a pusher, lower and upper parts of the electrode tab outside the lower welding surface.

10. The manufacturing method of claim 8, wherein the horizontal actuator is configured to move the clamping part in a horizontal direction along a guide rail by operation of a linear guide.

11. The manufacturing method of claim 8, wherein the vertical actuator is configured to move the clamping part in the vertical direction by operation of a cylinder.

12. The manufacturing method of claim 8, wherein fixing the electrode lead includes:
lowering a moving part of the fixing member to fix the electrode lead.

13. The manufacturing method of claim 8, further comprising:
after fixing the electrode lead, combining an electrode assembly and a pouch exterior member in a state in which parts of the electrode tab and the electrode lead are exposed to an outside of the pouch exterior member.

14. The manufacturing method of claim 8, wherein performing the ultrasonic welding includes:
applying an ultrasonic wave to the electrode tab and the electrode lead disposed between an lower welding surface of the anvil and an upper welding surface of the horn by operation of an ultrasonic wave actuator for welding and bonding.

\* \* \* \* \*